United States Patent [19]

Mielke et al.

[11] Patent Number: 4,780,988
[45] Date of Patent: Nov. 1, 1988

[54] METHOD OF PRODUCING ROD-SHAPED INCIPIENT PLANT CARRYING DEVICES

[75] Inventors: Johannes Mielke, Reinbek; Günter Böttcher, Hamburg; Paul Evert, Aumühle, all of Fed. Rep. of Germany

[73] Assignee: Körber AG, Hamburg, Fed. Rep. of Germany

[21] Appl. No.: 767,183

[22] Filed: Aug. 19, 1985

Related U.S. Application Data

[63] Continuation-in-part of Ser. No. 598,146, Apr. 9, 1984.

[30] Foreign Application Priority Data

May 25, 1983 [DE] Fed. Rep. of Germany ....... 3318869
Aug. 20, 1984 [DE] Fed. Rep. of Germany ....... 3430563

[51] Int. Cl.⁴ .......................... A01C 1/04; A01G 9/10
[52] U.S. Cl. ......................................... 47/58; 47/57.6; 131/369
[58] Field of Search ............... 47/57.6, 56, 77, 57.5, 47/DIG. 7; 131/84.1, 332, 369, 359, 108; 493/39, 46, 47, 50

[56] References Cited

U.S. PATENT DOCUMENTS

| T912,011 | 7/1973 | Harpham | 131/359 |
|---|---|---|---|
| 2,976,646 | 3/1961 | Hansen et al. | 47/56 |
| 3,054,410 | 9/1962 | Gould | 131/338 |
| 3,171,371 | 3/1965 | Gray et al. | 47/9 |
| 3,402,722 | 9/1968 | Kochalski | 131/108 |
| 3,456,386 | 7/1969 | Holden | 47/56 |
| 3,561,159 | 2/1971 | Adams, Jr. | 47/57.6 |
| 3,844,295 | 10/1974 | David | 131/84.1 |
| 3,877,172 | 4/1975 | Schwab et al. | 47/DIG. 7 |
| 3,939,849 | 2/1976 | Baxter | 131/332 |
| 4,196,543 | 4/1980 | Dedolph | 47/DIG. 7 |
| 4,219,966 | 9/1980 | McCalister | 47/57.6 |
| 4,411,280 | 10/1983 | Floyd | 131/332 |

FOREIGN PATENT DOCUMENTS

| 3049576 | 7/1982 | Fed. Rep. of Germany | 47/77 |
|---|---|---|---|
| 1557462 | 2/1969 | France | 47/77 |

Primary Examiner—Richard J. Johnson
Attorney, Agent, or Firm—Peter K. Kontler

[57] ABSTRACT

Rod-shaped incipient plant carrying devices which contain or can contain seeds or plant cuttings are formed from a web of paper and a filler of synthetic fibers and/or particles of synthetic foam which are first accumulated into a relatively thin but wide layer which is thereupon converted into a narrow stream. The stream is condensed and simultaneously draped into the web to form therewith a continuous rod which is severed by a cutoff to yield a file of discrete carring devices of unit length or multiple unit length. Particles of fertilizer can be admixed to the fibers and/or foam particles of the stream, and spaced-apart portions of the stream can receive seeds in such distribution that the seed in the finished carrying device is equidistant from both end faces of the filler. A bonding agent can be sprayed onto the layer to ensure adherence of neighboring fibers and/or foam particles to one another. The filler can consist of mineral fibers, cellulosic fibers, wood fibers, a mixture of such fibers, phenol-formaldehyde foam, urea formaldehyde foam, polystyrene foam, polyurethane foam, a mixture of such foams or a mixture of foam and fibers.

50 Claims, 3 Drawing Sheets

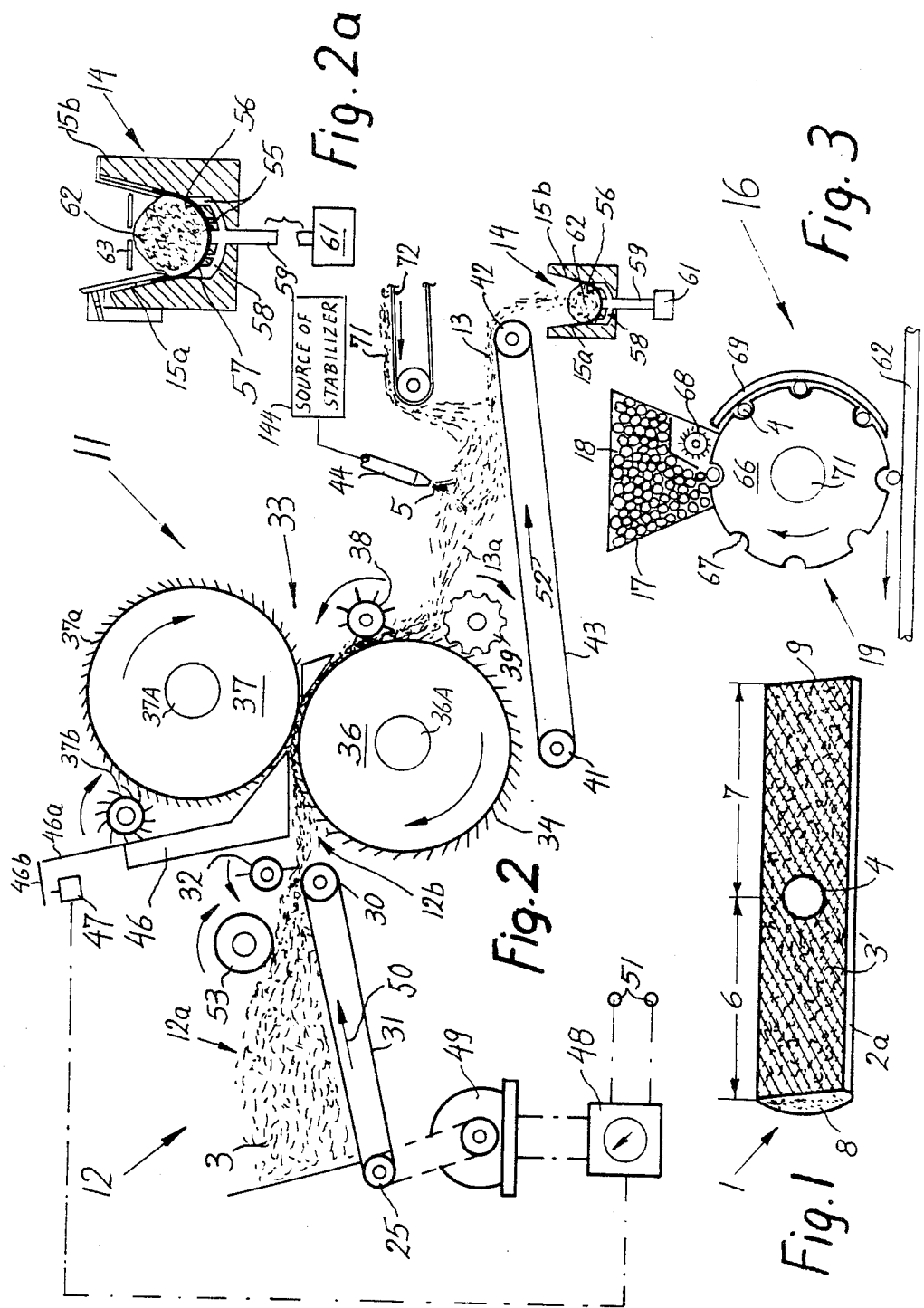

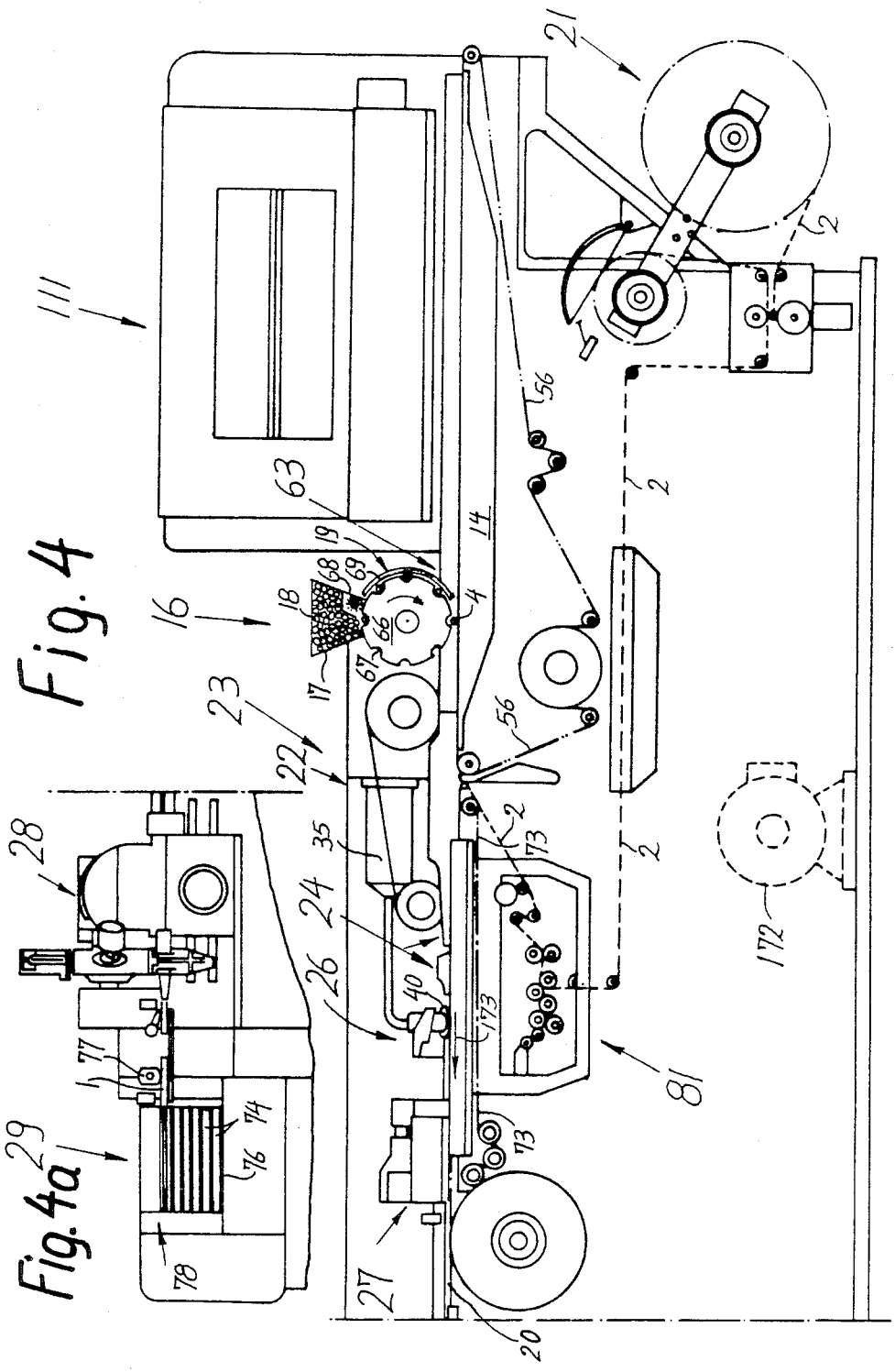

METHOD OF PRODUCING ROD-SHAPED INCIPIENT PLANT CARRYING DEVICES

CROSS-REFERENCE TO RELATED CASE

This is a continuation-in-part of our copending application Ser. No. 598,146 filed Apr. 9, 1984.

BACKGROUND OF THE INVENTION

The present invention relates to a method and apparatus for the mass-production of carrying devices for seeds or plant cuttings, i.e., for incipient plants (hereinafter called carrier devices or incipient plant carrying devices). More particularly, the invention relates to improvements in a method and apparatus for producing substantially cylindrical incipient plant carrying devices of the type wherein a tubular (e.g., cylindrical) envelope or wrapper surrounds a mass of filler material which can contain one or more seeds or plant cuttings.

It is already known to make carrying devices of the above outlined character by assembling filler material and a web of wrapping material into a rod which is thereupon severed to yield a succession of discrete carrying devices. The filler material is intended to provide a breeding ground for the germination of seeds and/or for the growing of roots, at least for a certain period of time before the plants can be embedded in soil in the field, in a garden or in a nursery.

U.S. Pat. No. 3,049,576 discloses substantially cylindrical incipient plant carrying devices, and U.S. Pat. No. 3,456,386 discloses a mode of producing such devices. The latter patent discloses the making of filler material in the form of an elongated strip which can consist of continuously produced lignocellulosic material. The strip is thereupon twisted so as to assume a substantially circular cross-sectional outline, and the thus twisted strip is brought into contact with a continuous carrier strip for seeds. The two strips are draped into a web of paper which forms a tubular envelope around the resulting twin-strip filler, and the thus obtained rod is severed at intervals to yield discrete incipient plant carrying devices. Such procedure is cumbersome and expensive in view of the need to form a continuous strip of filler material, to twice such strip, to form a continuous strip of spaced-apart seeds, and to bring the two strips together prior to the making of the actual rod of coherent incipient plant carrying devices.

OBJECTS AND SUMMARY OF THE INVENTION

An object of the invention is to provide a novel and improved method of making incipient plant carrying devices of finite length at a low cost, at a high frequency and by resorting to a surprisingly small number of steps.

Another object of the invention is to provide a method which renders it possible to mass-produce shorter or longer series of identical incipient plant carrying devices with a high degree of reproducibility.

A further object of the invention is to provide a method which can be used for the making of incipient plant carrying devices from inexpensive and readily available materials which can be manipulated in a simple and inexpensive way.

An additional object of the invention is to provide a method which can be resorted to for simultaneous treatment or conditioning of the filler material, such as fertilizing and/or bonding of its constituents to one another.

Still another object of the invention is to provide a novel and improved apparatus for the practice of the above outlined method.

A further object of the invention is to provide an apparatus which can produce substantially cylindrical incipient plant carrying devices of unit length or multiple unit length in a small area and with a relatively simple equipment.

An additional object of the invention is to provide the apparatus with novel and improved means for delivering to the filler material of incipient plant carrying devices one or more additives which contribute to more satisfactory consistency of components of the ultimate products and provide a more satisfactory breeding ground for the germination of seeds and/or growth of plant cuttings in the filler material.

A further object of the invention is to provide a novel and improved filler for incipient plant carrying devices of the above outlined character.

Another object of the invention is to provide novel and improved incipient plant carrying devices which are produced in accordance with the above outlined method.

A further object of the invention is to provide novel and improved incipient plant carrying devices which are produced in the above outlined apparatus.

An ancillary object of the invention is to provide a novel and improved method of manipulating freshly formed incipient plant carrying devices.

An additional object of the invention is to provide a novel and improved method of converting a mass of filler material into the fillers of a short or long series of coaxial incipient plant carrying devices of the type wherein a rod-like filler is surrounded by a tubular envelope or wrapper.

A further object of the invention is to provide a novel and improved incipient plant carrying device.

One feature of the invention resides in the provision of a method of producing substantially cylindrical incipient plant carrying devices of finite length. The method comprises the steps of establishing a source of particulate material consisting of synthetic foams and/or artificial fibers, continuously withdrawing particulate material from such source and accumulating the withdrawn particulate material into a relatively thin but preferably wide layer, advancing the layer along a first path, conveying a continuous web of flexible wrapping material along a second path which preferably extends substantially transversely of the first path, delivering (either directly or indirectly) successive increments at the leading end of the layer into the second path so that such increments together constitute an elongated narrow stream which can be formed ahead of or directly in a portion of the second path, draping the web around the stream to thereby convert the web and the stream into a preferably (but not necessarily) cylindrical rod wherein the particulate material constitutes a filler and the web constitutes a tubular wrapper or envelope surrounding the filler, and severing the rod at predetermined intervals so that the rod yields a succession (e.g., a single file) of discrete carrying devices of n times unit length wherein n is a whole number including one.

The fibers in the source can be mineral fibers (e.g., rock wool or glass (silicate) fibers), cellulosic fibers (e.g., ligneous fibers) or any other artificial fibers or mixtures of several types of fibers which can be used in a carrying device to allow for or to promote the germination of seeds or the growing of roots or additional roots by plant cuttings. The synthetic foam can be selected from the group consisting of phenol-formaldehyde, urea-formaldehyde, polystyrene and polyurethane (e.g., diphenyl-methane diisocyanate/polyether-polyol) foam. The source can also contain a mixture of fibers and particles of synthetic foam.

The establishing step can include accumulating a relatively large first supply of particulate material including particles of synthetic foam and/or at least partially interlaced or interlinked fibers, removing particulate material from the first supply, and gathering the removed particulate material into a relatively small second supply. The withdrawing step then preferably comprises drawing particulate material from the second supply because the rate of withdrawal of particulate material from a relatively small supply is much more predictable than if the particles were withdrawn directly from a substantial supply of particulate material. The establishing step preferably further comprises loosening and/or otherwise separating the particles from one another in the course of and/or prior to the removing step. The method can further comprise the step of densifying the particulate material which constitutes the second supply so that the density of particles constituting the second supply is maintained at a preferably constant value or within a rather narrow range of values. Still further, the method preferably comprises the step of monitoring the quantity of particulate material in the second supply, and the removing step then preferably comprises drawing particulate material from the first supply when the monitored quantity of particulate material in the second supply is depleted to a predetermined minimum acceptable value. The monitoring step can include the aforementioned densifying step, e.g., by subjecting the second supply to the densifying action of at least one mobile (e.g., reciprocable) tamping or compacting device which performs working strokes whose length is a function of the quantity of particulate material in the second supply. The aforementioned monitoring step then preferably includes monitoring the length of working strokes of the tamping device or devices because such length is directly or indirectly indicative of the density of particulate material which constitutes the second supply.

The step of drawing particulate material from the second supply can include withdrawing a stratum of particulate material from the second supply with the carding (e.g., pins and/or needles) of an endless conveyor (e.g., a rotating drum), and the accumulating step then includes expelling the thus withdrawn particulate material from the carding, e.g., by resorting to a rapidly rotating picker roller of the type often used in the distributors of cigarette rod making machines. Such method preferably further comprises the step of equalizing the stratum on the carding of the endless conveyor prior to the expelling step, e.g., by resorting to a second endless carded conveyor which brushes the surplus of particulate material back into the second supply.

The accumulating step can include propelling the withdrawn particulate material onto a conveyor (e.g., a relatively wide endless band or apron conveyor) which defines the first path.

The method can further comprise the step of contacting at least some particles of the particulate material with a bonding or stabilizing agent prior to the draping step so that at least some of the neighboring particles adhere to each other. The bonding agent can be a hardenable adhesive. Such bonding agent is preferably applied in liquid state and the contacting step then preferably includes spraying the bonding agent onto the particulate material in atomized or similar condition. For example, a liquid bonding agent can be sprayed onto the layer of particulate material in the first path.

The second path is preferably elongated, and the delivering step can include admitting successive increments at the leading end of the layer into an elongated channel which defines an elongated third path and preferably extends in the longitudinal direction of the second path so that the latter can constitute a continuation or extension of the third path. Such method further comprises the step of transporting the particulate material in the channel toward the second path, and the transporting step can include depositing the particulate material onto an endless band or belt conveyor and moving the conveyor in a direction to advance the particulate material thereon toward the second path. The transporting step can include employing an endless band conveyor which is preferably permeable to air and overlies at least the deepmost part (i.e., the bottom) of the channel. Alternatively, the conveyor can be designed to overlie the bottom as well as the sidewalls of a channel having a substantially U-shaped cross-sectional outline. The particulate material at the leading end of the layer can be showered onto the conveyor in the channel. If the conveyor portion of the channel resembles or constitutes an elongated trough which hugs the bottom as well as the sidewalls of the channel, the particulate material is preferably showered or propelled into such trough. A pressure differential can be established between the opposite sides of the conveyor to thereby urge the particulate material of the stream against one side of the conveyor. This can be achieved, by way of example, by reducing the pressure at the other side of the air-permeable conveyor to below atmospheric pressure so that the particulate material is attracted to the one side by suction.

As mentioned above, when the method is practiced by utilizing an elongated channel with or without a belt or band conveyor therein, the delivering step includes conveying the stream lengthwise along the third path which is preferably aligned with the second path and extends between the first and second paths, i.e., from the discharge end of the aforementioned apron conveyor to the locus where successive increments of the stream come into contact with successive increments of the running web. Such method then preferably further comprises the step of more or less positively transferring successive increments of the stream from the third path into the second path, i.e., onto the web of wrapping material in the second path. Such transferring step can comprise contacting the stream with a conveyor and moving the conveyor in a direction from the discharge end of the third path toward the inlet end of the second path. The web in the second path contacts one side of the stream prior to the draping step and the transferring step preferably includes employing an endless belt or band conveyor which contacts another side of the stream opposite or substantially opposite the one side. Still further, and if the conveyor which is used for carrying out the transferring step is permeable to air, the method can further comprise establishing a pressure differential between the opposite sides of the conveyor so that the stream is pneumatically urged against the conveyor. This can be achieved by reducing the pressure at one side of the conveyor to below atmospheric pressure so that the stream is attracted to the other side of the conveyor by suction.

The step of conveying the web along the second path can comprise moving the web lengthwise through the medium of a conveyor, (e.g., an endless conveyor belt or band) and the delivering step can include showering the particulate material which is to form the stream directly onto the web on such conveyor.

The stream can be equalized, (not unlike a tobacco stream) prior to the draping step.

Still further, the method can comprise depositing seeds onto the stream prior to the draping step. Such method can further comprise the step of establishing and maintaining a source of supply of seeds, and the seed depositing step then comprises withdrawing seeds from the respective source of supply and singularizing the seeds intermediate the respective source of supply and the locus of actual deposition of seeds onto or into the stream. The singularizing step can take place simultaneously with the seed withdrawing step; in fact, it can form part of the seed withdrawing step if the seeds are individually drawn from the source of supply. The stream is advanced in a predetermined direction, at least prior to but preferably also in the course of the draping step, and the seed depositing step can comprise imparting to the seeds a component of movement in the direction of advancement of the stream prior to actual deposition of seeds on the stream as well as a component of movement at right angles to such direction. The seed depositing step preferably further includes depositing on the stream at least one seed for each carrying device of finite length and at such intervals that each seed is disposed at a predetermined distance from the ends of the respective carrying device, preferably at least substantially midway between the end faces of the corresponding carrying device. More than one seed can be deposited in or on the stream for each carrying device.

The method can further comprise the step of contacting at least some particles of the particulate material with a suitable fertilizer prior to the draping step. The fertilizer may be solid fertilizer in the form of relatively small particles, such as granulae.

The material of the web is or can be a substance which readily and rapidly decomposes in soil. For example, the web can contain or consist of paper.

Still further, the method can comprise the steps of transporting successive carrying devices axially and thereupon deflecting successive carrying devices (either individually or in sets of two or more) into a path wherein the carrying devices advance sideways, i.e., at least substantially at right angles to their respective axes. Groups of the thus deflected carrying devices can be stored in containers, e.g., in a manner as disclosed in the commonly owned copending patent application Ser. No. 597,521 filed Apr. 6, 1984 by Mielke et al.

Another feature of the invention resides in the provision of an apparatus for producing incipient plant carrying devices of finite length. The apparatus comprises a source of particulate material consisting of particles of synthetic foam and/or fibers including or consisting of artificial fibers, means for withdrawing particulate material from the source, means for accumulating the thus withdrawn particulate material into a relatively wide but relatively thin layer and for advancing the layer along a first path, a reel or another suitable source of a web of flexible wrapping material, means for conveying the web from the respective source along a second path which is preferably at least substantially normal to the first path, means for converting successive increments at the leading end of the layer in the first path into a continuous stream which advances (either immediately or after having been transported by additional conveyor means) with the web along the second path, means for draping the web around the stream so as to convert the web and the stream into a continuous rod wherein the particulate material constitutes a filler and the web constitutes a tubular envelope or wrapper surrounding the filler, and means for severing the rod at predetermined intervals so that the rod yields a succession of discrete incipient plant carrying devices. As mentioned above, the fibers in the source of particulate material can contain mineral fibers (such as rock wool and/or glass fibers), the particulate material can contain or consist of cellulosic fibers, the particulate material can contain particles of phenol-formaldehyde, urea-formaldehyde, polystyrene and/or polyurethane (e.g., diphenyl-methane diisocyanate/polyether polyol) foam, or the particulate material can contain a mixture of one or more foams and fibers. Many other types of synthetic fibers and/or foams can be used with equal or similar advantage.

In accordance with a presently preferred embodiment of the apparatus, the source of particulate material contains a relatively large first magazine or reservoir for a rather substantial supply of particulate material, a relatively small second reservoir or magazine for a smaller supply of particulate material, and means for transferring particulate material from the first into the second magazine. The withdrawing means is then arranged to draw particulate material from the second magazine. Such apparatus preferably further comprises means for densifying the supply of particulate material in the second magazine. The densifying means can comprise means for maintaining the density of the supply of particulate material in the second magazine at a constant value or at least within a relatively narrow predetermined range. Still further, such apparatus preferably comprises means for monitoring the quantity of particulate material in the second magazine and for operating the transferring means when the supply of particulate material in the second magazine is depleted to a predetermined minimum value. Such monitoring means can include means for monitoring the level of the supply of particulate material in the second magazine and can include or constitute the aforementioned densifying means. Thus, the monitoring means can comprise at least one tamping device which is disposed at a level above the supply of particulate material in the second magazine and means for repeatedly lifting and thereupon releasing the tamping device or devices so that each such device descends by gravity onto and thereby compacts the supply of particulate material in the second magazine.

The means for withdrawing particulate material from the source of particulate material, especially from the second magazine, preferably comprises a carded conveyor, e.g., a rotary drum having a peripheral surface provided with pins and/or needles which constitute the carding. As a rule, the carded drum is arranged to withdraw from the source particulate material in excess of that which is required for the accumulation of the layer, and the apparatus then further comprises means for returning the excess from the carded drum into the source of particulate material. Such returning means can comprise a second carded conveyor which is driven to transport particulate material in a direction counter to that by the carded withdrawing conveyor so as to comb away the excess of particulate material and to return it into the respective source, preferably into the second magazine.

The means for accumulating the withdrawn particulate material into a layer can comprise a further conveyor and means, such as a rapidly rotating picker roller, for transferring particulate material from the carded withdrawing conveyor onto the further conveyor.

The apparatus can further comprise a source of fertilizer and means (e.g., a spreading or showering conveyor) for delivering fertilizer (preferably granulae of solid fertilizer) from the respective source to the particulate material ahead of the draping means, e.g., onto those portions of the layer which are about to be converted into a continuous stream.

Still further, the apparatus can comprise a source of supply of a suitable bonding agent (e.g., a plasticizer which is applied in a liquid state and thereupon sets to bond neighboring particles of particulate material to each other) for bonding the particles of particulate material to each other and means for delivering such bonding agent to at least some particles of particulate material intermediate the source of particulate material and the draping means, e.g., for spraying atomized bonding agent onto the particulate material which forms the layer.

If the second path is remote from the discharge end of the first path, the apparatus further comprises means for transporting the stream of particulate material in a direction toward the draping means, and more particulately toward the inlet of the second path. Such transporting means can comprise an elongated channel and an endless belt conveyor having a stream-contacting reach in the channel. This belt conveyor is preferably permeable to air and one side of its aforementioned reach contacts the stream in the channel. Such apparatus can further comprise (if necessary) means for urging the fibers of the stream in the channel against the one side of the reach. The urging means can comprise means for establishing a pressure differential between the one side and the other side of the aforementioned reach of the belt conveyor. The pressure differential establishing means can comprise a suction chamber which is adjacent to the other side of the reach.

A suitable trimming device can be provided to equalize the stream intermediate the accumulating means and the draping means. The provision of equalizing means ensures that the density of each and every increment of the filler in the rod is more likely to match or closely approximate an optimum density.

If the apparatus employs the aforementioned transporting means (such as the channel and the belt conveyor with one of its reaches in the channel), the apparatus can further comprise means for transferring the stream from the transporting means onto the web in the second path. As mentioned above, the transporting means can comprise a belt conveyor whose reach engages one side of the stream, and the transferring means can comprise a second belt conveyor which is arranged to engage another side of the stream opposite the one side and to more or less push the stream onto the web in the second path. Still further, such apparatus can comprise means for urging the particles of the stream against one side of the second belt conveyor, namely against one side of that stretch of the second belt conveyor which contacts the stream. The urging means can comprise means for establishing a pressure differential between the two sides of the just mentioned stretch, and the pressure differential establishing means can comprise a suction chamber adjacent to that side of the stretch which faces away from the stream. In such apparatus, the second belt conveyor must be permeable to air.

The apparatus can further comprise a source of supply of seeds and means for delivering seeds from such source to selected portions of the stream ahead of the draping means. The delivering means can comprise means for singularizing the seeds intermediate the source of supply of seeds and the stream.

The severing means is preferably arranged to form a single file of coaxial incipient plant carrying devices, and such apparatus can further comprise means for transporting or advancing the carrying devices of the single file axially and means for deflecting successive carrying devices of the file into a path wherein the carrying devices are caused to advance at right angles to their respective axes. Such mode of manipulating the carrying devices downstream of the severing means facilitates the gathering of carrying devices into desirable arrays preparatory to introduction of arrays into trays or other suitable containers, e.g., in a manner as disclosed in the aforementioned commonly owned U.S. patent application of Mielke et al.

An additional feature of the invention resides in the provision of an incipient plant carrying device which is preferably produced in accordance with the above outlined method and in the aforediscussed apparatus. The device comprises an elongated tubular (preferably cylindrical) envelope or wrapper and a rod-like filler consisting of particles of synthetic foam and/or a fibrous material and which is confined in the envelope. At least one seed can be confined within the envelope, and such seed or seeds are preferably embedded in the filler, e.g., in such a way that the seed or seeds are equidistant from both axial ends of the carrying device. As mentioned above, the filler can contain or consist of mineral fibers (such as rock wool or glass fibers) or it may consist of or contain cellulosic fibers. Alternatively, the filler can contain particles of phenol-formaldehyde, urea-formaldehyde, polystyrene and/or polyurethane (e.g., diphenyl-methane diisocyanate/polyether polyol foam or a mixture of fibers and foam. Also, the filler can contain a plasticizer or other suitable means for bonding at least some particles of particulate material to each other in regions where the particles contact each other so as to thereby stabilize the filler. Also, particles of fertilizer can be distributed in the filler to enhance the ability of the filler to establish optimum circumstances for germination of seeds or for the growth or roots if the carrying device contains a plant cutting or the germinated seed remains therein long enough to grow roots.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective axial sectional view of a cylindrical incipient plant carrying device with a single seed which is produced in accordance with the method and in the apparatus of the present invention;

FIG. 2 illustrates a source of fibers, means for withdrawing fibers from the source, means for accumulating the withdrawn fibers into a layer, and means for converting successive increments at the leading end of the layer into a continuous stream of fibers;

FIG. 2a is an enlarged view of the means for converting successive increments at the leading end of the layer of fibers into a stream and of the means for transporting the stream toward the path for the web of wrapping material;

FIG. 3 is an enlarged partly elevational and partly sectional view of the source of supply of seeds and of the means for delivering seeds to the stream of fibrous material;

FIG. 4 is an overall elevational view of the major part of the apparatus with a portion of the source of supply of seeds broken away;

FIG. 4a illustrates the severing means and the means for manipulating the incipient plant carrying devices of finite length.

DESCRIPTION OF THE PREFERRED EMBODIMENTS

Figure 5:
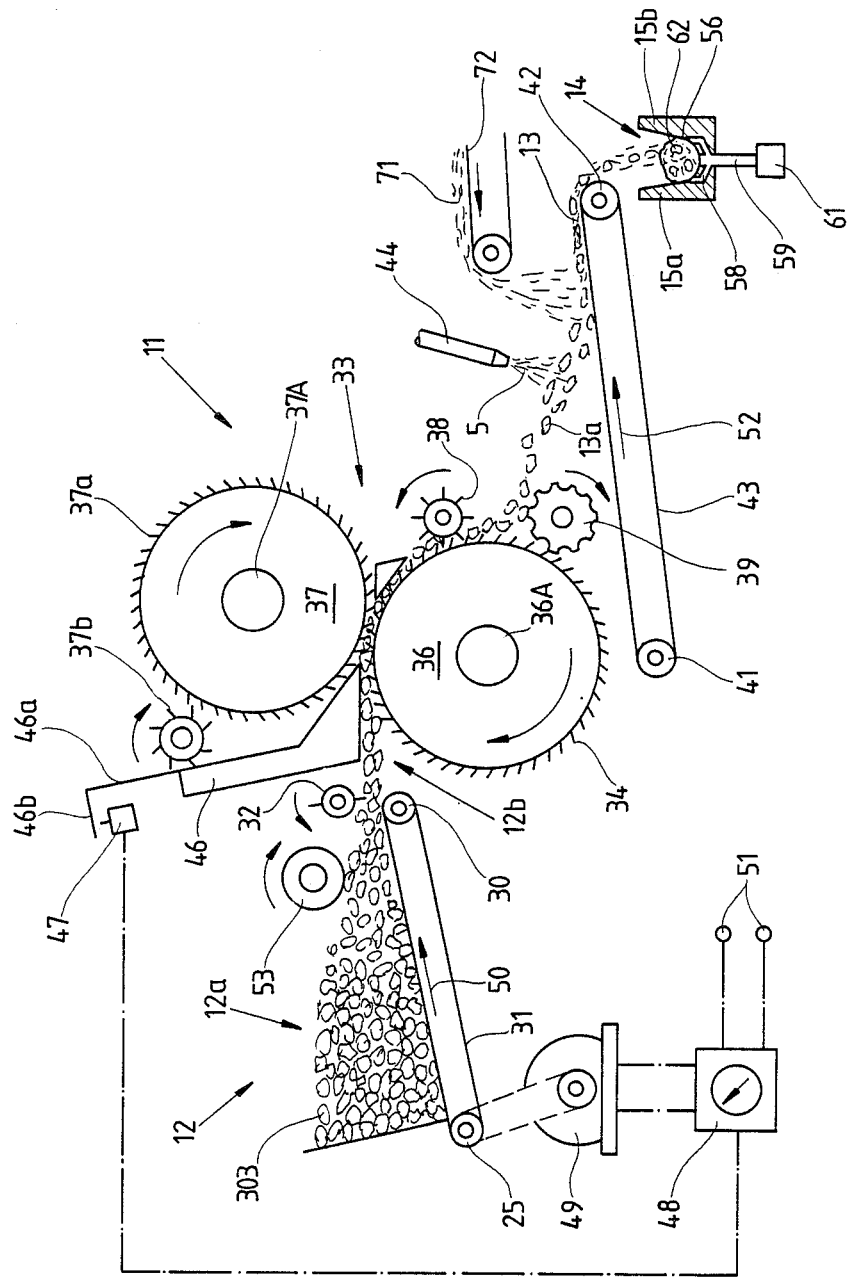
FIG. 5 illustrates a source of particles of synthetic foam, means for withdrawing particles of foam from the source, means for accumulating the withdrawn particles into a layer, and means for converting successive increments at the leading end of the layer into a continuous stream of particles of foamed synthetic material.

Referring first to FIG. 1, there is shown an incipient plant carrying device 1 which comprises a tubular (preferably cylindrical) envelope or wrapper 2a surrounding a rod-like filler 3' which, in accordance with one feature of the invention, consists of or contains a substantial percentage of artificial fibers which may but need not always be bonded to each other so as to stabilize the filler. As explained above, the filler 3' may consist of or comprise mineral synthetic fibers, such as rock wool and/or glass (silicone) fibers. Alternatively, or in addition thereto, the filler 3' can consist of or contain cellulosic fibers. It is also possible to employ ligneous (wood) fibers in conjunction with the aforeenumerated and/or other fibers. What counts is to ensure that the filler 3' provides a satisfactory or highly satisfactory breeding ground for germination of seeds (one shown at 4) or for the growth of roots if the filler surrounds a portion of a plant cutting or contains a seed for a period of time which is long enough to complete the germination and proceed with the growing of roots. In the embodiment which is shown in FIG. 1, the seed 4 is disposed at equal distances (6 and 7) from both end faces (8 and 9) of the filler 3'. This is not absolutely necessary but is advisable because it is then immaterial in which orientation the carrying device 1 is embedded in soil in a field, in a nursery, in a garden, in a pot or elsewhere. The envelope 2a can consist of paper or any other material which is likely to decompose in soil within a relatively short interval of time. However, it is also possible to make the envelope 2a of a suitable synthetic plastic material, and such material can exhibit a reasonably or even pronounced resistance to rapid decomposition in soil, depending on the intended use and manipulation of the carrying device 1. For example, if the carrying device 1 is to be implanted in soil prior to any germination of the seed 4 therein, it may be advisable to select for the envelope 2a a material which can withstand disintegration in soil for an interval of time long enough to ensure that the supply of nutrients (e.g., granulae of fertilizer) in the filler 3' is exhausted before the material of the envelope 2a is decomposed.

The improved carrying device 1 can be produced without a seed 4 therein. In such instances, the structure which is shown in FIG. 3 and is used to admit seeds 4 to the stream of fibers which are converted into the fillers of a succession of coherent carrying devices can be omitted or rendered inactive. The apparatus which manipulates finished carrying devices is then provided with means for forming a recess: in one of the end faces 8, 9 so as to provide room for insertion of one or more seeds or of a portion of a cutting. The means for forming such recesses is disclosed in the aforementioned copending United States patent application of Mielke et al.

The apparatus which is shown in FIGS. 2, 2a, 3, 4 and 4a serves for the mass-production of incipient plant carrying devices 1 inclusive of insertion of seeds 4 whereby each device 1 can contain a single seed or two or more seeds. Such apparatus comprises a source 12 of fibers 3 which is shown in detail in FIG. 2, a unit 11 which serves to withdraw fibers from the source 12 at a controlled rate, and endless apron conveyor 43 which forms part of the means for accumulating the withdrawn fibers 3 into a relatively wide but thin layer 13 of fibrous material and for advancing the layer 13 along a first path which is indicated by the arrow 52, a reel 21 (note FIG. 4) or another suitable source of a continuous web 2 of flexible wrapping material, a conveyor 73 which constitutes a means for conveying the web 2 along an elongated second path (arrow 173 in FIG. 4) which is normal or at least substantially normal to the path of the layer 13 on the upper reach of the apron conveyor 43 of FIG. 2, means (shown in detail in FIG. 2a) for converting successive increments at the leading end of the layer 13 into a continuous stream 62 of fibers which, sooner or later, advances with the web 2 along the second path, a draping or wrapping mechanism 23 (FIG. 4) which constitutes a means for draping the web 2 around the stream 62 so as to convert the stream and the web into a continuous cylindrical rod 20 wherein the fibers 3 constitute the fillers 3' and the web 2 constitutes the envelopes 2a of a series of coherent incipient plant carrying devices 1, and a cutoff 28 (shown in FIG. 4a) constituting a means for severing the leader of the moving rod 20 at predetermined intervals so as to convert the rod into a file of coaxial carrying devices 1. The source 17 of seeds 4 and the means 16 for supplying such seeds from the source 17 to the moving stream 62 (both shown in FIG. 3) are optional but desirable and advantageous. The supplying means 16 comprises a device 19 which singularizes the seeds 4 on their way from the source 17 to the stream 62 so as to ensure that discrete seeds are delivered to uniformly spaced-apart portions of the stream. The construction which is shown in FIG. 3 is preferred at this time in view of its simplicity and compactness; however, it is equally within the purview of the invention to provide a discrete seed singularizing device which need not form part of the seed delivering means. For example, the source 17 can contain a chute which delivers discrete seeds, one after the other, to a conveyor which, in turn delivers discrete seeds to spaced apart portions of the stream 62.

Since the path for the web 2 is remote from the path for the layer 13, the apparatus of FIGS. 2 to 4a further comprises an endless belt conveyor 22 (shown in FIG.

4) which assists in transferring successive increments of the stream 62 of fibers 3 onto the upper side of the web 2 on the conveyor 73. The draping mechanism 23 comprises a so-called format 24 which can be similar or analogous to the format of a cigarette rod making machine wherein a stream of tobacco particles is draped into a continuous web of cigarette paper or like wrapping material. The format 24 is followed by a paster 26 which provides one marginal portion of the web 2 with a film of adhesive before such one marginal portion is folded over the other marginal portion to complete the conversion of the web 2 into a continuous cylindrical envelope or wrapper of the rod 20. The seam which is formed by the overlapping marginal portions of the web 2 is heated or cooled by a plate-like sealer 27 (depending on the nature of the adhesive which is applied by the paster 26) to promote the setting of adhesive and to enable the envelope to withstand the stresses which develop when the rod 20 is severed by the knife or knives of the cutoff 28 so that the rod 20 yields a file of discrete carrying devices 1 or n-times unit length (wherein n is a whole number including one). The apparatus further comprises means 29 (shown in FIG. 4a) for manipulating the freshly formed carrying devices 1 downstream of the cutoff 28, namely to first transport the single file of carrying devices 1 axially and to thereupon deflect successive carrying devices sideways so that they advance along a path wherein they move at right angles to their respective axes, e.g., on their way to a row forming device of the type disclosed in the aforementioned commonly owned United States patent application of Mielke et al.

The source 12 comprises a relatively large first magazine or reservoir 12a which stores a substantial supply of fibers 3, and a relatively small second magazine or reservoir 12b which stores a relatively small supply of fibers. Furthermore, the source 12 comprises means for transferring fibers 3 from the magazine 12a into the magazine 12b, when necessary, preferably in such a way that the quantity of fibers in the smaller magazine 12b remains at least substantially constant or fluctuates within a rather narrow range. The transferring means comprises an endless belt conveyor 31 whose upper reach supports the supply of fibers 3 in the magazine 12a and which is trained over pulleys 25, 30. The pulley 25 can be intermittently driven by an electric motor 49 in response to signals which are transmitted by a timer 48 serving to connect the motor 49 to a source 51 of electrical energy when the supply of fibers 3 in the second magazine 12b is depleted to a certain predetermined minimum acceptable value. The direction in which the upper reach of the belt conveyor 31 advances the fibers 3 toward the magazine 12b when the circuit of the motor 49 is completed is indicated by the arrow 50. The magazine 12a further contains a loosening device 32 in the form of a driven paddle wheel whose paddles serve to loosen the interlaced fibers and to break up at least the larger agglomerations of fibers in order to allow for the formation of a layer 13 whose width and height are constant or practically constant. A rotary roller-shaped refuser 53 is provided in the magazine 12a to ensure that the height of the supply of fibers 3 in the range of the paddles of the wheel 32 is at least substantially constant. The directions in which the paddle wheel 32 and the refuser 53 rotate are indicated by arrows.

In the embodiment which is shown in FIG. 2, the smaller second magazine 12b is defined by a rotary carded drum-shaped withdrawing conveyor 36 and a similar rotary carded drum-shaped equalizing conveyor 37 which latter serves to return the surplus or excess of withdrawn fibers 3 back into the magazine 12b. The carded conveyor 36 is an element of the withdrawing unit 11 and its carding 34 consists of needles or pins extending from its peripheral surface and serving to entrain a stratum of fibers 3 from the magazine 12b, i.e., from the upstream side of the nip 33 of the conveyors 36 and 37. The carding 37a of the conveyor 37 is similar or identical to the carding 34 of the conveyor 36. A paddle wheel 37b is provided to expel the fibers 3 from the carding 37a of the conveyor 37 so that the expelled fibers return into the second magazine 12b. The shafts 36A and 37A drive the conveyors 36, 37 to advance fibers 3 in opposite directions. Each of these shafts rotates clockwise; however, and since the conveyors 36, 37 are disposed at the opposite sides of the path of fibers 3 from the magazine 12b, their cardings 34, 37a move fibers 3 in opposite directions.

The means for expelling the stratum of fibers 3 from the carding 34 of the withdrawing conveyor 36 comprises a rapidly driven picker roller 38 which propels the expelled fibers into the range of a driven rotary winnower 39 serving to spread the fibers on the upper reach of the apron conveyor 43. The latter is trained over pulleys 41, 42 and its upper reach advances in the direction which is indicated by the arrow 52. The pulley 41 and/or 42 can be driven by the main prime mover 172 (FIG. 4) of the apparatus or by a discrete prime mover (e.g., a constant-speed electric motor, not shown). As mentioned above, the width of the layer 13 on the upper reach of the apron conveyor 43 greatly exceeds its height and the winnower 39 ensures that the distribution of fibers 3 on such upper reach is uniform or reasonably uniform to thus enhance the formation of a satisfactory stream 62. The formation of a homogeneous layer 13 contributes significantly to uniformity of fillers 3' in the finished incipient plant carrying devices 1. The axial length of the winnower 39 at least equals the width of the apron conveyor 43, and this winnower showers the fibers 3 across the full width of the upper reach of the conveyor 43. The shower is indicated at 13a. The fibers 3 of the shower 13a are at least substantially separated from one another as a result of separating action of the paddle wheel 32, of the action of carding 34, of the action of the picker roller 38, and of the action of the winnower 39.

The apparatus further comprises a source 144 of a bonding or stabilizing agent which is conveyed from the source 144 by a nozzle 44 serving to form a spray 5 which is distributed on fibers 3 forming the layer 13 or even prior to formation of such layer, i.e., on the fibers which form the shower 13a. The purpose of the stabilizing agent is to bond the contacting portions of neighboring fibers 3 to one another and to thus stabilize the fillers 3' of the finishing carrying device 1. The purpose of the stabilizing agent (which may constitute an adhesive) is analogous to that of the plasticizer which is used in filter rod making machines to bond portions of fibers to each other so that each filter plug defines a maze of passages for the flow of tobacco smoke therethrough. Reference may be had, for example, to commonly owned U.S. Pat. No. 4,317,425 granted Mar. 2, 1982 to Greve et al. The atomizing action of the nozzle 44 is preferably assisted by compressed air in a manner well known from the art of liquid atomizers. By way of example, the stabilizing agent can constitute liquid polyvinyl acetate. It is desirable to employ a biologically disintegratable stabilizing agent which allows for separation of fibers 3 after a certain period of time, e.g., after planting in the soil.

The means for applying a stabilizing agent constitutes an optional feature of the improved apparatus. Thus, if the characteristics of the fibers 3 are such that a bonding of neighboring fibers is not necessary or desirable, the means 44, 144 is omitted or is rendered inactive. A stabilizing agent will be used if the fibers 3 cannot be readily processed to form a satisfactory layer 13 and/or a satisfactory stream 62 without the bonding of at least some neighboring fibers to each other. It will be recalled that the fibers which are transported from the first magazine 12a to the apron conveyor 43 are subjected to several loosening or separating actions so that they may be overly loose on the upper reach of the conveyor 43. On the other hand, pronounced loosening of fibers ahead of the conveyor 43 is desirable and advantageous because it contributes to the formation of a homogeneous layer 13.

FIG. 2 further shows a source (e.g., the upper reach of an endless belt or band conveyor 72) of comminuted particles (e.g., granulae) of a suitable solid fertilizer 71 which can be showered onto the layer 13 prior to conversion of succession increments at the leading end of this layer into the stream 62. The main source of fertilizer can constitute a hopper or silo which is not specifically shown in the drawing. The admission of particles of fertilizer 71 is advisable and even desirable if the fibers 3 cannot furnish all required nutrients to the seeds 4 and/or to the roots of a plant. The speed of the conveyor 72 is preferably synchronized with that of the apron conveyor 43 so as to ensure that the rate of admission of particles of fertilizer 71 is properly related to the quantity of fibers 3 in successive increments of the layer 13 and stream 62.

FIG. 2 further shows one of preferably several tamping or densifying devices 46 which are provided to densify the fibers 3 constituting the supply of such fibers in the smaller second magazine 12b. Such tamping devices 46 are lifted at regular intervals by a lifting device including a rod or bar 46a and are then allowed to descend by gravity and to compact the material in the magazine 12b. Adequate compacting of fibers 3 in the magazine 12b prior to engagement of such fibers by the carding 34 of the conveyor 36 contributes to the formation of a homogeneous layer 13 on the apron conveyor 43. A suitable system of tamping devices is disclosed, for example, in French Pat. No. 1,557,462 wherein a camshaft repeatedly lifts a full battery (e.g., a row) of tampers at different intervals and allows the raised tampers to descend by gravity. For such purpose, the shaft carries a set of eccentric cams which are angularly offset relative to each other and each of which can lift a discrete tamper by way of a lever or the like.

The tamping device or devices 46 of the means for densifying the fibers 3 of the supply of fibers in the smaller second magazine 12b can further constitute elements of a means for monitoring the quantity of fibers 3 in the magazine 12b. Thus, as these devices compact the contents of the magazine 12b to form a mass of constant density, their downward or working strokes become longer with progressing depletion of the supply of fibers 3 in the magazine 12b. Consequently, the length of working (downward) strokes of the tamping device or devices 46 is an accurate indicator of the quantity of fibers 3 in the magazine 12b. When the length of such strokes reaches a predetermined value, the trip 46b on the illustrated motion transmitting or lifting rod 46a actuates a normally open switch 47 which causes the timer 48 to complete the circuit of the motor 49 for an interval of time which is required to transfer a batch of fibers 3 from the magazine 12a into the magazine 12b. Such transfer can involve the delivery of a relatively small quantity of fibers; therefore, activation of the timer 48 can be repeated at frequent intervals to thus ensure that the quantity of fibers in the smaller second magazine 12b fluctuates very little or practically not at all. The timer 48 is preferably adjustable (and/or the speed of the motor 49 is adjustable) to allow for a regulation of the quantities of fibers 3 which are transferred from the magazine 12a into the magazine 12b in response to each starting of the conveyor 31.

Successive increments at the leading end of the layer 13 on the upper reach of the apron conveyor 43 advance beyond the pulley 42 and are showered into an elongated channel 14 which forms part of the means for transporting the stream 62 to the path for the web 2. The channel 14 has a substantially U-shaped cross-sectional outline and its bottom 57 as well as the inner sides of its sidewalls 15a, 15b are overlapped by the substantially trough-shaped upper reach of an endless belt conveyor 56. The discharge end of the apron conveyor 43 showers fibers 3 directly into the trough-shaped upper reach of the belt conveyor 56. If the roughness of the surfaces of the conveyor 56 does not suffice to ensure adequate adherence of fibers 3 thereto, the apparatus is further equipped with means for urging the stream 62 against the respective side of the upper reach of the conveyor 56. Such urging means is designed to establish a pressure differential at the opposite sides of the upper reach of the conveyor 56 which latter is permeable to air so that the means for establishing the pressure differential comprises a simple suction chamber 58 machined into the bottom 57 and communicating with upwardly extending suction ports 55 which terminate at the underside of the upper reach of the conveyor 56. A conduit 59 connects the suction chamber 58 with a suction generating device 61, e.g., a fan.

If the channel 14 is replaced with a channel defining a substantially square or rectangular passage or path for the stream 62, the conveyor 56 can be replaced with a conveyor which overlies only the flat bottom of such modified channel. The inner sides of the sidewalls of the modified channel are then vertical and parallel to one another. The suction chamber 58, the suction generating device 61, the conduit 59 and the ports 55 are optional; they can be dispensed with or rendered inactive if the fibers 3 of the stream 62 adhere to the conveyor 56 with a force which ensures predictable transport of the stream toward the web 2. The path which is defined by the channel 14 and the conveyor 56 extends at right angles to the plane of FIG. 2 or 2a, i.e., in parallelism with the plane of FIG. 4.

A suitable trimming or equalizing device 63 (indicated in FIG. 2a by a horizontal line for the sake of simplicity) can be provided to remove the surplus from the stream 62 and to thus ensure the formation of an even more uniform filler for draping into the web 2. The details of the trimming device 63 form no part of the present invention. For example, this trimming device can be of the type disclosed in British Pat. No. 1,365,517 and/or in the corresponding U.S. Patent.

If the stream 62 contains particles of fertilizer, such particles are preferably uniformly distributed therein. Of course, it is also possible to concentrate the particles of fertilizer close to the locus of the seed or seeds 4 in the fillers 3' of the finished carrying devices 1. This depends on the intended treatment of the devices 1, i.e., to what extent a plant is to be developed therein before the material of the wrapper 2a is decomposed.

FIG. 3 shows one presently preferred embodiment of the means 16 for supplying seeds 4 to the stream 62. Such means comprises a source 17, e.g., a funnel or a hopper which contains a replenishable supply 18 of seeds 4 and whose outlet is adjacent to the apex of a rotary drum-shaped combined seed singularizing and depositing device 19 having a cylindrical rotor 66 driven by a shaft 71 in synchronism with the conveyor 56 and web 2 and having axially parallel peripheral flutes or recesses 67 for discrete seeds 4. An arcuate shroud 69 is provided adjacent to that side of the rotor 66 which carries the seeds 4 from the outlet of the source 17 to the stream 62. The shroud 69 can be omitted if the seeds 4 are held in the flutes 67 by suction in a manner which is well known from the art, e.g., from the art of transporting cigarettes or filter plugs in the flutes of cylindrical conveyors. If the seeds 4 are held in the flutes 67 by pneumatic means, the rotor 66 is provided with discrete ports or groups of ports (not shown) for drawing air from the flutes 67 and with channels or bores which connect such ports with a suction chamber (e.g., by way of a valve plate which is adjacent to one end face of the rotor 66) while the respective flutes 67 carry seeds 4 from the outlet of the hopper 17 to the stream 62. The shaft 71 for the rotor 66 is driven by the main prime mover 172 of the apparatus which is shown schematically in FIG. 4 and which further drives the belt conveyor 56, the belt conveyor 22, the moving parts of the draping mechanism 23, the cutoff 28 and the means 29 for manipulating the carrying devices 1 downstream of the cutoff 28. The seeds 4 can be delivered to that portion of the stream 62 which advances in the channel 14 toward the web 2, i.e., upstream or ahead of the draping mechanism 23. The mutual spacing of singularized seeds 4 in the flutes 67 and the peripheral speed of the rotor 66 (with reference to the speed of the conveyor 56 for the stream 62) are selected in such a way that the seeds 4 are deposited in uniformly spaced-apart portions of the stream, namely preferably midway between the planes where the knife or knives of the cutoff 28 sever the rod 20 so that the latter yields a succession of discrete carrying devices 1. This ensures that the seeds 4 are disposed at selected distances from the end faces 8, 9 of the respective carrying devices 1, preferably midway between such end faces.

By enlarging the flutes 67 and/or by increasing the number of flutes at the periphery of the rotor 66 and/or by increasing the speed of the rotor, the structure of FIG. 3 can be used to deliver two or more seeds 4 per carrying device 1. A rotary cylindrical brush 68 is installed in the hopper 17 adjacent to its outlet to brush away superfluous seeds 4 from the oncoming flutes 67 and to thus promote the singularizing action of the seed supplying means 16.

The supplying means 16 constitutes an optional feature of the improved apparatus. Thus, if the apparatus is to form carrying devices without one or more seeds therein, the supplying means 16 is omitted or deactivated. The seeds or cuttings are then introduced into recesses which are provided in the end faces 8 or 9 of the finished carrying devices 1, for example, during introduction of such devices into trays or other types of containers in a manner as disclosed in the aforementioned copending U.S. patent application of Mielke et al.

FIG. 4 shows schematically a distributor 111 which includes all of the parts shown in FIGS. 2 and 2a including the channel 14 and the belt conveyor 56 which latter delivers the stream 62 onto the web 2 while the web is transported by the upper reach of an endless belt conveyor 73. FIG. 4 further shows a portion of the aforementioned endless belt conveyor 22 which constitutes a means for transferring or for assisting in transfer of successive increments of the stream 62 onto the web 2 on the conveyor 73. The arrangement is such that the lower reach of the preferably air-permeable conveyor 22 actually pushes the respective (upper) side of the stream 62 toward and onto the web 2. A suitable conveyor which can serve as a stream transferring means is disclosed, for example, in U.S. Pat. No. 2,853,079. The upper side of the lower reach of the conveyor 22 is preferably adjacent to a suction chamber which establishes a pressure differential between opposite sides of the lower reach and thus urges the fibers 3 of the stream 62 against the underside of the lower reach by suction. This further promotes the predictability of transfer of successive increments of the stream 62 onto the running web 2. An air-permeable conveyor with appurtenant means for attracting fibrous or like materials by suction is shown and disclosed, for example, in U.S. Pat. No. 3,039,474.

The draping mechanism 23 serves to convert the web 2 and the stream 62 thereon into the aforementioned continuous rod 20 which is ready to be subdivided into discrete carrying devices 1. The conveyor 73 for the web 2 constitutes the means for advancing the web and the stream 62 through the draping mechanism in such a way that the so-called format 24 of the mechanism 23 causes the web to be draped around the stream save for one of its marginal portions which extends upwardly and is coated with a suitable adhesive (e.g., a wet adhesive or a hotmelt) by the wheel-shaped applicator 40 of the paster 26, e.g., a paster of the type used in cigarette rod making or filter rod making machines The format 24 further effects gradual densification of the stream 62 during draping of the web 2 therearound. The reference character 35 denotes in FIG. 4 a source of adhesive supplied to the peripheral surface of the applicator wheel 40 which forms a film of adhesive at one side of the aforementioned upwardly extending marginal portion of the web 2. Details of a format and of a paster which can be used in the apparatus of FIG. 4 are disclosed in U.S. Pat. Nos. 3,915,176 and 3,380,352.

In the next step, the adhesive-coated marginal portion is folded over the other marginal portion of the web 2 so that the two marginal portions form a longitudinally extending axially parallel seam of the resulting tubular envelope which surrounds the condensed stream 62, i.e., the filler of the rod 20. The seam is then heated or cooled (depending on the nature of the adhesive in the tank 35) by one or more platelike sealers 27 in order to ensure rapid setting of the adhesive and to thus reduce the likelihood of opening of the seam during severing of the rod 20 by the knife or knives of the cutoff 28 which follows the sealer 27, as considered in a direction from the right to the left of FIG. 4. A suitable sealer which can be used in the apparatus of FIGS. 4, 4a is disclosed, for example, in U.S. Pat. No. 3,507,288.

As mentioned above, the cutoff 28 can be designed to sever from the leading end of the continuously advancing rod 20 carrying devices of n-times unit length, normally carrying devices of unit length or double unit length. Details of a cutoff which can be used in the apparatus of FIGS. 4, 4a are disclosed and shown in U.S. Pat. No. 3,176,560. The arrangement is preferably such that the knife or knives of the cutoff 28 are suitably inclined and travel with the rod 20 during severing to thereupon return to their starting positions prior to the making of the next cut or cuts. This ensures that the planes of the end faces 8, 9 of the carrying devices 1 are normal to the axes of such devices. As a rule, such mode of severing the rod 20 can be ensured by appropriate inclination of the rotary carrier for the knife or knives of the cutoff 28. A modified cutoff with a reciprocating carrier for knives, which can also find use in the apparatus of the present invention, is disclosed in U.S. Pat. No. 3,241,413.

The details of the unit 29 which manipulates the carrying devices 1 downstream of the cutoff 28 may be of the type disclosed in U.S. Pat. No. 33,602,357. This unit includes a rotating accelerating cam 77 which accelerates successive carrying devices 1 of the single file of such devices downstream of the cutoff 28 so that successive devices 1 are separated from each other by gaps of requisite width, namely by gaps which allow for a changing of the direction of movement of successive accelerated devices 1 from axial movement to a movement at right angles to their respective axes. The accelerating cam 77 propels successive carrying devices 1 or successive pairs of carrying devices into successive axially parallel peripheral flutes 74 of a drum-shaped conveyor 76 at a deflecting station 78 whereby the direction of each carrying device 1 which enters the corresponding flute 74 is changed from axial to sidewise, i.e., from a movement in the direction of the axis of the respective carrying device to a movement at right angles to the axis. The lobe or lobes of the cam 77 engage the external surfaces of the envelopes or wrappers 2a of the respective carrying devices 1 with a force which suffices to allow for predictable acceleration of the engaged carrying devices for movement all the way into the registering flutes 74 of the conveyor 76. Such mode of changing the direction of rod-shaped commodities is well known from the art of cigarette making and like machines.

The mode of operation of the improved apparatus is as follows:

The distributor 111 contains the instrumentalities which convert loose or substantially loose fibers 3 into the stream 62, and such stream is advanced by the upper reach of the belt conveyor 56 in the channel 14 in or in parallelism with the plane of FIG. 4 past the means 16 for supplying seeds 4 at a location 63 upstream of the wrapping mechanism 23. The distributor 111 contains the instrumentalities which are shown in FIGS. 2 and 2a, i.e., the source 12 with the magazines 12a, 12b and the tamping device or devices 46 for densification of the supply of fibers in the magazine 12b and for simultaneous monitoring of the quantity of fibers in the magazine 12b. As explained above, the motor 49 is started intermittently by the switch 47 and timer 48 to thus ensure that the supply of fibers 3 in the smaller magazine 12b is replenished when necessary so that such supply fluctuates within a very narrow range which is beneficial to the quality of the filler in the rod 20.

The carding 34 of the conveyor 36 continuously draws fibers 3 from the densified supply in the second magazine 12b and the resulting stratum of fibers is combed by the carding 37a of the conveyor 37 before it reaches the picker roller 38 which cooperates with the winnower 39 to form the shower 13a which is converted into the layer 13 on the upper reach of the apron conveyor 43. If necessary, the nozzle 44 sprays atomized stabilizing agent onto the layer 13, and the conveyor 72 delivers particles of fertilizer 71 onto the layer 13 downstream of the nozzle 44.

The discharge end of the apron conveyor 43 effects (at 42) the conversion of successive increments at the leading end of the layer 13 into successive increments or unit lengths of the stream 62 which advances at right angles to the direction of advancement of the layer 13 by moving with the upper reach of the endless belt conveyor 56 between the sidewalls 15a, 15b of the channel 14. As mentioned above, the urging means including the suction chamber 58 can be provided or activated if the conveyor 56 tends to slip with reference to the stream 62 so as to ensure that the speed of forward movement of each increment of the stream 62 will match the speed of the conveyor 56. Also, if necessary or desirable, the trimming device 63 removes the surplus from the stream 62 before the latter reaches the draping mechanism 23 and is entrained by the running web 2 on the conveyor 73 to advance through the garniture 24 with attendant compacting of fibers 3 and draping of the web around the compacted stream. The draping operation begins downstream of the supplying means 16 which delivers seeds 4 to longitudinally spaced-apart portions of the stream 62. The manner in which the seeds 4 are singularized and delivered to the stream 62 at the locus 63 has been described above with reference to FIG. 3.

The endless belt conveyor 22 assists in the transfer of successive increments of the stream 62 from the conveyor 56 onto the web 2 by pushing the stream 62 in a direction to the left, as viewed in FIG. 4. The densified filler of the rod 20 is fully confined in the envelope or wrapper (converted web 2) immediately downstream of the paster 26 and ahead of the sealer 27 by a device which folds the adhesive-coated marginal portion of the web 2 over the other marginal portion. The sealer 27 then causes the adhesive between the two marginal portions to set before the respective portions of the rod 20 reach the cutoff 28 which subdivides the rod into a single file of coaxial carrying devices 1. The cam 77 accelerates successive discrete carrying devices 1 or groups of two or more coaxial carrying devices and propels them into the registering flutes 74 of the rotating conveyor 76. The conveyor 76 delivers the carrying devices 1 from the deflecting station 78 to the tray filler or to another processing station, not shown.

The aforementioned term 37 loosening" and like terms used in connection with the action of the paddle wheel 32, refuser 53, carding 34, picker roller 38 and winnower 39 are not intended to denote that each and every fiber 3 must be fully separated from each neighboring fiber but rather that the loosening or separation of fibers should suffice to ensure the formation of a homogeneous layer 13 and the conversion of such layer into a homogeneous stream 62. It is important to ensure that clumps of strongly coherent fibers 3 be broken up or at least greatly reduced in size so as to avoid the presence of such clumps in the layer 13 and/or in the stream 62.

The reference character 81 denotes in FIG. 4 an imprinting mechanism which can be used to provide the exposed side of the web 2 (i.e., that side Which is visible upon conversion of the web 2 into the tubular wrapper of the rod 20) with information including the trademark, trade name and/or name of the manufacturer, instructions how to handle the carrying devices 1, and/or information pertaining to the seed or seeds 4 in the fillers 3 of such devices. The mechanism 81 can be designed for the application of indicia in a single color or in two or more colors.

The width of the apron conveyor 43 can equal or approximate the width of the distributor 111 (as considered in the longitudinal direction of the channel 14). Thus, the diameter or width of the stream 62 in the channel 14 is a small or minute fraction of the width of the layer 13 on the apron conveyor 43. For example, the width of the channel 14, and hence of the stream 62, need not appreciably exceed the diameter of the rod 20 or a carrying device 1.

The stabilizing agent which is admitted by the nozzle 44 or other suitable means need not necessarily bond the fibers 3 to each other or it may be selected with a view to establish relatively weak bonds which can be terminated in response to repeated wetting or on implanting of the carrying devices 1 in soil. The fertilizer 71 is preferably selected in such a way that it is not consumed in response to a single wetting, i.e., that it discharges nutrient substances at a relatively slow rate to thus ensure the establishment of a long-lasting supply of nutrients for the respective seeds or cuttings The improved apparatus is susceptible of many additional modifications without departing from the spirit of the invention. For example, the channel 14 and the conveyor 56 can be omitted if the distributor 111 is designed to shower successive increments at the leading end of the layer 13 directly onto the web 2 on the conveyor 73. This contributes significantly to compactness and simplicity of the apparatus. In such apparatus, the upper reach of the conveyor 73 is preferably deformed to form a trough which imparts a similar shape to the web 2 thereon so that the distributor 111 can shower the fibers 3 of the layer 13 into the web 2 at the location where the web constitutes or resembles a trough which is open from above for admission of fibers by gravity feed.

The illustrated apparatus with the channel 14 and conveyor 56 is desirable or advantageous when the stream 62 is to be provided with seeds and/or if the stream must be treated in one or more other ways intermediate the apron conveyor 43 and the wrapping mechanism 23. Another reason for the provision of the channel 14 and preferably air-permeable conveyor 56 is that certain types of fibers 3 may not adhere to the web 2 with a sufficient force to ensure a predictable formation of the stream 62. As mentioned above, the air-permeable conveyor 56 can cooperate with the suction chamber 58 to ensure predictable transport of fibers 3 along the path which is defined by the channel 14. Once the stream 62 is formed and properly accelerated, it can be more readily transferred onto the web 2 so that it advances with the web without slippage, especially if the apparatus further comprises the aforediscussed stream transferring conveyor 22 which can also cooperate with a suction chamber to prevent slippage of fibers relative to its surface.

While it is possible to simply allow seeds 4 to descend onto the moving stream 62 by gravity feed, the utilization of the aforementioned rotor 66 is desirable and advantageous because this rotor imparts to each seed a component of movement in the direction of movement of the stream 62 therebelow as well as a component of movement at right angles to the longitudinal direction of the stream. This can be readily seen by considering the direction of rotation of the rotor 66 in FIG. 3 and by bearing in mind that, in this Figure, the stream 62 advances in a direction to the left. Such mode of delivering seeds 4 is much more likely to ensure that each seed will be embedded in a predetermined portion of the respective filler 3, i.e., at a desired distance (6, 7) from each end face (8, 9) of the respective carrying device 1.

The treatment of carrying devices 1 which are removed from the improved apparatus by the flutes 74 of the rotary drum-shaped conveyor 76 of FIG. 4a can include transport into trays or other types of containers, transport into another storing unit or transport to a machine wherein neighboring carrying devices 1 are connected to each other by a strip which constitutes a distancing means and facilitates the insertion of the thus interconnected carrying devices into soil at a predetermined distance from one another.

An advantage of artificial fibers 3 is that they can be produced at a low cost in readily available machines and also that they can be processed into fillers 3' with a high degree of reproducibility so that the dimensions, density, nutritive value and/or other desirable characteristics of each of a short or long series of such carrying devices are always the same.

FIG. 5 shows a structure which is identical with that of FIG. 2 except that the source 12 contains a supply of particles 303 of synthetic (artificial) foam. For example, the source 12 can contain a supply of particles which consist of phenol-formaldehyde, urea formaldehyde, polystyrene and/or polyurethane (e.g., diphenylmethane diisocyanate/polyether polyol) foam. It is also possible to employ a mixture of particles of synthetic foam and artificial fibers. The source 12 can also contain peat in admixture to particles of synthetic foam and/or artificial fibers. All that counts is to ensure that the filler which is made from the particles (which may be in the-form of flakes, fibers, fragments and/or the like) provides a satisfactory breeding ground for the seeds or cuttings with or without fertilization of the material of the filler. If the source 12 contains particles of foam, such particles can be further comminuted on their way to the cutoff 28, e.g., by the carding 34 and/or 37a, by the picker roller 38 and/or by the winnower 39.

Phenol-formaldehyde foams which can be used in the apparatus embodying the structure of FIG. 5 are sold in particulate form by Smithers-Oasis of Kent, Ohio under the mark OASIS.

Urea-formaldehyde foams in the form of flakes are sold by COMPO GmbH, Münster-Hansdorf/Westphalia, German Federal Republic, under the mark HYGROMULL. COMPO GmbH further sells a mixture of between 50 and 70 percent of its urea-formaldehyde flakes with 30 to 50 percent of flakes consisting of polystyrene foam and manufactured under the mark STYROMULL by BASF AG, Ludwigshafen, German Federal Republic; such mixture is sold under the mark HYGROPOR. BASF AG also sells a polystyrene foam under the mark STYROPOR.

A polyurethane foam which can be used for the making of fillers in the apparatus of the present invention is manufactured by BAYER AG, Leverkusen, German Federal Republic, under the mark BAYSTRAT.

All of the above substances can be used alone, in combination with each other, in combination with fibrous particles and/or in combination with peat.

The remaining parts of the apparatus which embodies the structure of FIG. 5 are identical with those of the apparatus which is shown in FIGS. 2 to 4a.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of producing substantially cylindrical incipient plant carrying devices of finite length, comprising the steps of establishing a source of particulate material which contains a synthetic foam continuously withdrawing particulate material from he source and accumulating the withdrawn particulate material into a relatively thin layer; advancing the layer along a first path; conveying a continuous web of wrapping material along a second path substantially transversely of the first path; delivering successive increments at the leading end of the layer into the second path so that such increments together constitute an elongated narrow stream; draping the web around the stream so as to convert the web and the stream into a rod wherein the particulate material constitutes a filler and the web constitutes a tubular wrapper surrounding the filler; and severing the rod at predetermined intervals so that the rod yields a succession of discrete carrying devices.

2. The method of claim 1, wherein the particulate material in the source includes mineral fibers.

3. The method of claim 2, wherein the source contains rock wool.

4. The method of claim 2, wherein the source contains glass fibers.

5. The method of claim 2, wherein the source contains cellulosic fibers.

6. The method of claim 1, wherein said synthetic foam is selected from the group consisting of phenol-formaldehyde, urea-formaldehyde, polystyrene and polyurethane foams.

7. The method of claim 1, wherein the particulate material in the source contains diphenylmethane diisocyanate/polyether polyol foam.

8. The method of claim 1, wherein the particulate material in the source contains a mixture of fibers and particles of synthetic foam.

9. The method of claim 1, wherein said establishing step includes accumulating a relatively large first supply of at least partially interlaced particulate material, removing particulate material from the first supply, and gathering the removed particulate material into a relatively small second supply, said withdrawing step including drawing particulate material from the second supply.

10. The method of claim 9, wherein said establishing step further includes loosening the particulate material in the course of and/or prior to said removing step.

11. The method of claim 9, further comprising the step of densifying the particulate material which constitutes the second supply to a preselected value.

12. The method of claim 9, further comprising the step of monitoring the quantity of particulate material in the second supply, said removing step including drawing particulate material from the first supply when the monitored quantity of particulate material in the second supply is depleted to a predetermined minimum value.

13. The method of claim 10, wherein said monitoring step includes subjecting the particulate material of the second supply to the densifying action of at least one mobile tamping device which performs working strokes whose length is a function of the quantity of particulate material in the second supply, and monitoring the length of working strokes of the tamping device.

14. The method of claim 9, wherein said drawing step includes withdrawing a stratum of particulate material from the second supply with the carding of an endless conveyor and said accumulating step includes expelling the withdrawn stratum of particulate material from the carding by a rapidly rotating picker roller.

15. The method of claim 14, further comprising the step of equalising the stratum of particulate material on the carding of the endless conveyor prior to said expelling step.

16. The method of claim 1, wherein said accumulating step includes propelling the withdrawn particulate material onto a conveyor which defines the first path.

17. The method of claim 1, further comprising the step of contacting at least some particles of the particulate material with a bonding agent prior to said draping step so that at least some of the neighboring particles of particulate material adhere to each other.

18. The method of claim 17, wherein the bonding agent is a hardenable adhesive.

19. The method of claim 17, wherein the bonding agent is applied in a liquid state and said contacting step includes spraying the bonding agent onto the particulate material in atomized condition.

20. The method of claim 17, wherein said contacting step includes spraying the bonding agent in a liquid state onto the layer of particulate material in said first path.

21. The method of claim 1, wherein said second path is elongated and said delivering step includes admitting successive increments at the leading end of the layer into an elongated channel which extends in the longitudinal direction of the second path.

22. The method of claim 21, further comprising the step of transporting the particulate material in the channel toward the second path.

23. The method of claim 22, wherein said transporting step includes depositing the particulate material onto an endless belt conveyor and moving the conveyor in a direction to advance the particulate material thereon into the second path.

24. The method of claim 23, wherein the channel has a deepmost part and said transporting step includes employing an endless belt conveyor which overlies at least the deepmost part of the channel.

25. The method of claim 23, wherein said depositing step includes showering the particles of particulate material onto the conveyor in the channel.

26. The method of claim 23, further comprising the step of imparting to the conveyor in the channel the shape of an elongated trough and said depositing step includes showering the particles of particulate material into such trough.

27. The method of claim 23, further comprising the step of establishing a pressure differential between opposite sides of the conveyor to thereby urge the particulate material against one side of the conveyor.

28. The method of claim 27, wherein the conveyor is permeable to air and said step of establishing a pressure differential includes reducing the pressure at the other side of the conveyor to below atmospheric pressure.

29. The method of claim 1, wherein said delivering step includes conveying the stream lengthwise along a third path which is aligned with the second path and extends between the first and second paths.

30. The method of claim 29, further comprising the step of transferring successive increments of the stream from the third path onto the web in the second path.

31. The method of claim 30, wherein said transferring step comprises contacting the stream with a conveyor and moving the conveyor in a direction from the third toward the second path.

32. The method of claim 30, wherein the web in the second path contacts one side of the stream prior to the draping step and said transferring step includes employing an endless belt conveyor which contacts another side of the stream opposite the one side of such stream.

33. The method of claim 31, wherein the transferring step further comprises establishing a pressure differential at the opposite sides of the conveyor so that the particulate material of the stream is pneumatically urged against the conveyor.

34. The method of claim 33, wherein the transferring step includes employing an endless belt conveyor one side of which contacts the stream and which is permeable to air, said step of establishing a pressure differential including reducing the pressure at the other side of the conveyor to below atmospheric pressure.

35. The method of claim 1, wherein said conveying step includes moving the web lengthwise through the medium of a conveyor and said delivering step includes showering the particulate material of the layer onto the web on the conveyor.

36. The method of claim 1, further comprising the step of equalizing the stream prior to said draping step.

37. The method of claim 1, further comprising the step of depositing seeds onto the stream prior to said draping step.

38. The method of claim 37, further comprising the step of establishing and maintaining a source of supply of seeds, said seed depositing step including withdrawing seeds from the source of supply and singularizing the seeds intermediate the source of supply and the locus of deposition of seeds onto the stream.

39. The method of claim 38, wherein said singularizing step takes place simultaneously with said seed withdrawing step.

40. The method of claim 37, further comprising the step of advancing the stream in a predetermined direction at least prior to said draping step, said seed depositing step including imparting to the seeds a component of movement in said direction prior to actual deposition of seeds on the stream.

41. The method of claim 40, wherein said seed depositing step further comprises imparting to the seeds a second component of movement at right angles to said direction.

42. The method of claim 37, wherein said seed depositing step includes depositing on the stream at least one seed for each carrying device of finite length and at such intervals that each seed is disposed at a predetermined distance from the ends of the respective carrying device.

43. The method of claim 1, further comprising the step of contacting at least some particles of the particulate material with fertilizer prior to said draping step.

44. The method of claim 43, wherein said contacting step includes supplying to the particulate material a solid fertilizer in the form of small particles.

45. The method of claim 44, wherein the particles of fertilizer are granulae.

46. The method of claim 1, wherein the web consists of a material which readily decomposes in soil.

47. The method of claim 46, wherein the web includes or consists of paper.

48. The method of claim 1, further comprising the steps of transporting successive carrying devices axially and thereupon deflecting successive carrying devices into a path wherein the carrying devices advance at least substantially at right angles to their respective axes.

49. The method of claim 48, further comprising the step of storing groups of carrying devices in containers.

50. The method of claim 48, wherein said severing step includes converting the rod into a single file of coaxial carrying devices of n times unit length wherein n is a whole number including one.

* * * * *